United States Patent
Abdalla et al.

(10) Patent No.: US 6,735,312 B1
(45) Date of Patent: May 11, 2004

(54) CRYPTOGRAPHIC METHOD FOR RESTRICTING ACCESS TO TRANSMITTED PROGRAMMING CONTENT USING $f$-REDUNDANT ESTABLISHMENT KEY COMBINATIONS

(75) Inventors: Michel Ferreira Abdalla, La Jolla, CA (US); Yuval Shavitt, Marlboro, NJ (US); Avishai Wool, Livingston, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/310,056

(22) Filed: May 11, 1999

(51) Int. Cl.[7] .............................. H04N 7/167; H04L 9/00
(52) U.S. Cl. ...................... 380/239; 380/216; 713/163
(58) Field of Search ................................ 380/239, 216; 713/163

(56) References Cited

U.S. PATENT DOCUMENTS 5,592,552 A * 1/1997 Fiat ............................ 713/163

* cited by examiner

Primary Examiner—Gilberto Barron
Assistant Examiner—Benjamin E. Lanier

(57) ABSTRACT

A method for encrypting programming in which a controlled number of unintended recipients of a broadcast are allowed to view a program so that a set of encryption keys can be found which enables a broadcaster to more quickly broadcast the program to its intended paying recipients than conventional encryption methods which only allow programs to be viewed by its intended recipients. To find the set of keys, a broadcaster first determines an acceptable f-ratio of a total number of viewers of the broadcast program to a number of intended viewers in an identified target set who paid to receive the program. The target set of viewers is included in the total number of viewers.

The broadcaster then constructs an f-redundant establishment key allocation set from which the establishment keys for encrypting the program are selected. The establishment key allocation set includes keys for the unintended viewers, and can be implemented as a tree having descending levels of sets with higher level sets having larger populations of viewers. An approximation algorithm is then used to select a key cover set of establishment keys from the establishment key allocation set, wherein the keys in the cover set are used to encrypt the program. The key cover set uses fewer establishment keys to encrypt a program than conventional encryption methods, thereby resulting in fewer transmissions being required to broadcast a program to all of its intended paying recipients and thus providing a more efficient and less expensive method of broadcasting encrypted programming.

12 Claims, 3 Drawing Sheets

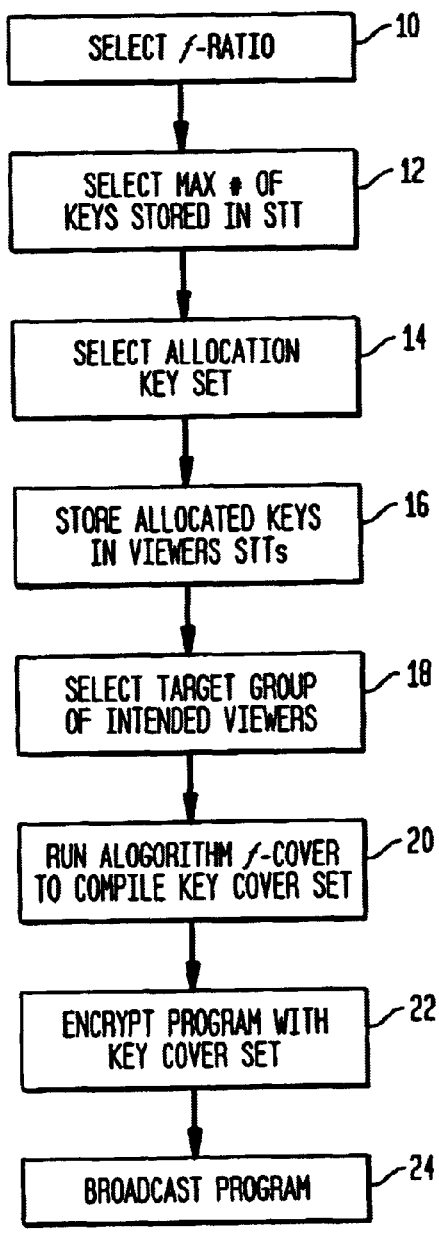
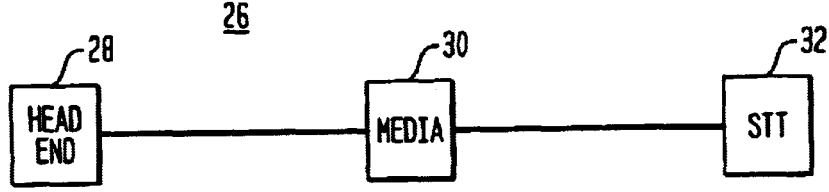

0. $R \leftarrow \emptyset; C \leftarrow \emptyset$
1. Repeat
2.     $A \leftarrow \{S_i : \frac{|S_i \backslash R|}{|(K \cap S_i) \backslash R|} \leq f\}$. (* Candidate sets *)
3.     $A \leftarrow S_i \in A$ which maximizes $|(K \cap S_i) \backslash R|$.
4.     $R \leftarrow R \cup A; C \leftarrow C \cup \{A\}$.
5. until the candidate collection A is empty.
6. return R, C.

CRYPTOGRAPHIC METHOD FOR RESTRICTING ACCESS TO TRANSMITTED PROGRAMMING CONTENT USING $f$-REDUNDANT ESTABLISHMENT KEY COMBINATIONS

FIELD OF THE INVENTION

The present invention relates generally to broadcast encryption methods, and more particularly to a method for reducing the number of encryption keys and thus the number of transmissions required to transmit an encrypted program to its intended recipients.

BACKGROUND OF THE INVENTION

Conventional encryption methods are widely used today to limit the number of viewers who can view certain broadcast programs, such as pay-per-view programs. Broadcasters use such methods to securely transmit program content over cable or satellite television systems, or over the Internet, to prevent viewers who have not paid for the program from either intentionally or unintentionally being able to view the program. Such programs are typically broadcast to a population of viewers from a head-end transmitter which securely encrypts the programs using establishment keys selected by the head-end transmitter so that only viewers who paid for the program can view the program. In order to decrypt the program, these intended viewers are provided with set-top terminals (STTs) containing the establishment keys.

The STTs typically contain a chip having a secure memory capable of storing approximately 100 establishment keys. This secure memory is generally non-volatile, and tamper-resistant in order to decrease the likelihood of piracy. It is also preferably writeable so that it can be reprogrammed with different establishment keys for other programs, such as a future pay-per-view event.

Each viewer typically stores a plurality of establishment keys in their STT, some of which may be shared by other viewers. Consequently, when the head-end transmitter transmits a program encrypted with certain keys to a particular group of viewers, viewers who are not in this group but who possess these common keys in their STT will also be able to view the program.

Before it can transmit an encrypted program to any of its viewers, a broadcast system operator must first allocate establishment keys which are stored in the STT provided to each one of its subscribers. At present there are two conventional methods used for allocating establishment keys so that only certain intended viewers can decrypt a program, either: (a) each different potential viewer is allocated a unique establishment key for decrypting a program; or (b) viewers are allocated multiple common establishment keys which they share with other viewers, wherein a separate key is allocated for each possible combination of at least two viewers from all of the possible viewers and each viewer receives those keys for combinations of viewers which include them.

Programs are encrypted by the head-end transmitter with one key each time they are transmitted. Thus, if method (a) is used, the head-end transmitter will transmit a program as many times as there are members of an intended target group, with the program being encrypted with a different one of the unique establishment keys each transmission, thereby ensuring that each member of the target group receives the program. If method (b) is used, the head-end transmitter will transmit a program only once, since it can use a key that exactly corresponds to the target group.

Alternatively, the head-end transmitter need not re-encrypt a program multiple times in order to broadcast the program to its intended recipients. Instead, the head-end can encrypt the program once with a program entitlement which it in turn encrypts as many times as the number of keys it has to use to ensure that each member of a target group of viewers receives the program. The program entitlement is attached as a header at the beginning of the transmission of a program. Since less bandwidth is required to transmit a program entitlement than is required to transmit a program, this method of transmitting encrypted programming results in shorter transmission lengths, especially when method (a) is used. When a program entitlement is used to encrypt a program, the establishment keys in the STT decrypt the entitlement in order for the program to be viewed.

The conventional encryption methods described above suffer from significant drawbacks. Method (a) typically requires repeated encrypted transmissions of a program, wherein with each transmission the program is encrypted with a different key possessed by at least one member one of the target set of viewers to ensure that all such intended viewers receive the program. Consequently, during such repeated transmissions a broadcaster is unable to use the broadcast bandwidth to broadcast other revenue generating programming. Method (b) typically requires users to store a prohibitively large number of establishment keys in their STT in order to be able to decrypt programs.

SUMMARY OF THE INVENTION

A method for encrypting programming, wherein by allowing a controlled number of unintended recipients to receive a broadcast of a program, a smaller set of encryption keys can be selected for encrypting the program, thereby requiring fewer transmissions to broadcast the program to each member of a target set of intended recipients who paid to receive the program than is required using conventional encryption methods which only allow programs to be viewed by its intended recipients. The method operates by determining an acceptable f-ratio of a total number of viewers of the broadcast program to a number of intended viewers in an identified target set who paid to receive the program. The target set of viewers is included in the total number of viewers. In one preferred embodiment, the f-ratio is selected so that the total number of viewers is between one to two times the number of viewers in the target set, for any possible target set.

The broadcast system operator constructs an f-redundant establishment key allocation set from which the establishment keys for encrypting the program are selected. An approximation algorithm is then used to select a key cover set of establishment keys from the establishment key allocation set, wherein the keys in the cover set are used to encrypt the program. The key cover set uses fewer establishment keys to encrypt a program than conventional methods which only allow paying viewers to receive a program, thereby requiring fewer transmissions to broadcast a program to all of its intended paying recipients and consequently providing a more efficient and less expensive method of broadcasting encrypted programming.

BRIEF DESCRIPTION OF THE DRAWINGS

FIG. 1 shows a flowchart depicting the operation of the method for cryptographically restricting access to transmitted programming content using f-redundant establishment key combinations according to the present invention.

FIG. 3 shows a block diagram of a broadcast system used to encrypt and broadcast a program according to the present invention.

DETAILED DESCRIPTION OF THE INVENTION

An exemplary embodiment of a method for encrypting and broadcasting programming using f-redundant establishment key combinations according to the present invention is now described. The present invention enables a broadcast system operator to broadcast a program to a target set of intended viewers using fewer encryption keys than conventional encryption techniques by allowing a predetermined number of viewers outside of the target set to also receive the program, thereby reducing the number of transmissions required to broadcast the program to the target set of viewers. This enables broadcast bandwidth which would otherwise be used to broadcast the program to the target set of viewers to instead be used by the broadcast system operator to broadcast other revenue generating programming.

FIG. 1 shows a flowchart depicting the operation of the present invention. At step 10, the broadcast system operator selects an appropriate f-ratio representing the acceptable maximal ratio between a total number of viewers and a target set of viewers who paid to receive a program to be broadcast. This ratio is preferably selected to be between 1 and 2 in order to minimize both the number of keys and thus the number of transmissions required to broadcast the program and the number of unintended recipients able to receive the broadcast. At step 12, the broadcast system operator selects a maximum number of establishment keys which are to be stored in each STT.

At step 14, the head-end transmitter selects the full establishment key allocation set. From this allocation set, the particular keys which any individual viewer has stored in their STT can be determined. Once the key allocation set has been selected, then at step 16, the different keys comprising the set are stored in the STTs of the viewers, with each particular viewer receiving their respective keys. Steps 10–16 of the present invention are performed once to allocate establishment keys to each individual viewer.

At step 18, the target group K of intended recipients of a particular program is selected. At step 20, the algorithm f-cover shown in FIG. 2 and described below is run to compile an f-redundant key cover set from the f-redundant key allocation set of keys for encrypting the program. At step 22, this key cover set is used to encrypt a program, which is then broadcast to the viewers at step 24. The key cover set minimizes the number of transmissions required to broadcast a program to the target set of viewers who paid to receive the program. Steps 18–24 of the present invention are performed each time a particular program is encrypted and broadcast to a particular target group of viewers.

Figures 2, 4:
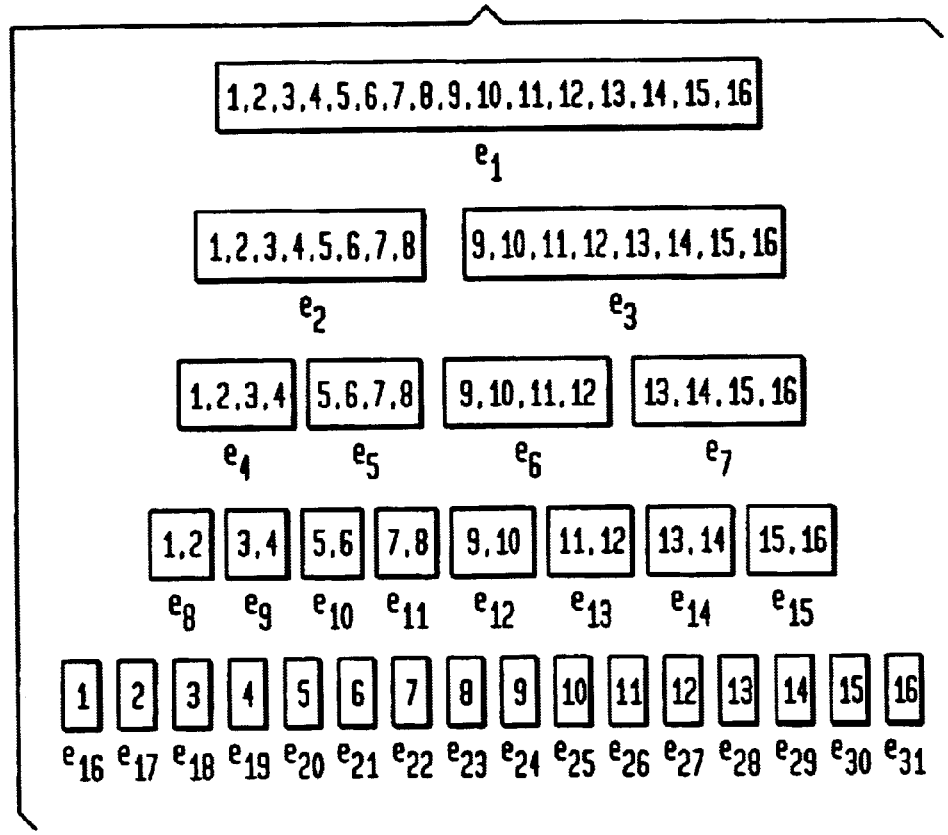
FIG. 2 shows the algorithm f-cover used to encrypt programs according to the present invention.
FIG. 4 shows an exemplary embodiment of an f-redundant key allocation set from which a key cover set for encrypting a program can be compiled according to the present invention.

FIG. 2 shows the algorithm f-cover used to compile the key cover set. This algorithm is a greedy approximation algorithm. In order to understand both how the f-redundant key allocation set is constructed and how the key cover set is compiled using the algorithm f-cover, the following terms need to be defined. U represents the set of all viewers who can receive broadcasts from the head-end transmitter, wherein the total number of members of U=n. K denotes the target set of viewers who paid to view a particular program. The establishment keys used to encrypt and decrypt programs are described by a collection of key sets S, wherein $S=\{S_1, S_2, \ldots\}$ such that $\cup S_i = U$. Each set $S_i$ is comprised of at least one establishment key $e_i$ which is stored in the memory of every STT u which is an element of $S_i$. The number of keys an STT u stores is equal to the number of sets $S_i$ to which it belongs. A key cover of K is a collection of sets S that contain a particular target set. For a target set K, a key cover of K would be the collection of sets $S_i$ which are elements of S whose union contains K, wherein $C(K) \subseteq S$ such that $K \subseteq \cup_{S_i \in C(K)} S_i$.

When a broadcast system operator transmits a program to all the members of a target set K, it encrypts the message using establishment keys $e_i$ corresponding to the sets $S_i$ that are elements of the key cover set C(K) and broadcasts each encryption separately. The set of recipients of a given key cover set C(K) is denoted by $R_c(K)$ and equals the union of all sets $S_i$ that are elements of C(K). The total number of recipients is then denoted by $r_c(K) = |R_c(K)|$. Establishment key allocations are f-redundant if the total number of recipients divided by the population in the target set is less than or equal to f ($r_c(K)/(k) \leq f$).

FIG. 3 shows a block diagram of a broadcast system 26 used to encrypt and broadcast a program according to the present invention, wherein the selection and compilation of establishment keys, and the encryption of a program using such establishment keys is performed at a head-end transmitter 28 which selects a transmission media 30, e.g., cable, over which it broadcasts the encrypted program. An STT 32 receives the program and decrypts it for viewing by the intended recipient.

The present invention operates by dividing allocation key sets into multiple levels containing sets having populations of equal size, with sets at successive lower levels having smaller size populations. The algorithm f-cover is then run in stages starting at the highest level and continuing downwards with each successive level processed in turn, until the key cover set is complied. In an alternative embodiment, the key allocation set can be implemented using a tree structure, wherein the tree is constructed by recursively partitioning higher level sets into equally sized, disjointed sets in a next, lower level. This tree structure can be a binary tree scheme in which a high level set is split into two equally sized sets, wherein the number of keys required to be stored in STTs is $\log_2 n$. This enables the greedy algorithm f-cover to run in time linear in the size of the cover set, rather than in total number of sets in the collection. To do so, the process begins at the root of the tree defining the set U and then traverses the set in either a depth first search (DFS) or breadth first search (BFS) order, both of which are well known algorithms for searching through the nodes of a tree. Whenever an f-redundant set is found, it is selected, and the subtree beneath it is ignored.

FIG. 4 shows an exemplary embodiment of an f-redundant key allocation set which is constructed for a population of 16 viewers. Establishment key $e_1$ is allocated to the set of total possible viewers, i.e., viewers numbers 1, 2, 3, 4, 5, 6, 7, 8, 9, 10, 11, 12, 13, 14, 15 and 16, who all have key $e_1$ stored in their STTs. Establishment key $e_2$ is allocated to the set of viewers numbers 1, 2, 3, 4, 5, 6, 7 and 8, and so forth as shown in FIG. 4. Thus for these 16 viewers there are 31 total possible establishment keys which can be used to encrypt programs.

If the target set of viewers who paid to receive a particular program is assumed to be viewers numbers 5, 6 and 7, then the candidate establishment keys from which the algorithm f-cover can compile a key cover set for such viewers are keys $e_1$, $e_2$, $e_5$, $e_{10}$, $e_{11}$, $e_{20}$, $e_{21}$ and $e_{22}$. If for this same example it is assumed that the f-ratio selected by the broadcast system operator is between one and two, then establishment keys $e_1$ and $e_2$ can not be used since the ratio of total viewers to the target viewers found using each of these establishment keys is greater than two. However, establishment key sets: $e_5$; $e_{10}$ and $e_{11}$; and $e_{20}$, $e_{21}$ and $e_{22}$, can each be used since they provide an acceptable f-ratio of viewers. Although the present invention is designed to minimize the number of required transmissions by allowing unintended viewers to receive an encrypted program, it is possible for the present invention to be used without any unintended viewers receiving the program. For example, using the set of establishment keys $e_{10}$ and $e_{22}$ in the preceding example provides an f-ratio of 1, i.e., (3 total viewers)/(3 target viewers), such that only target viewers numbers 5, 6 and 7 will receive the encrypted program.

In an alternative embodiment of the present invention, the number of encrypted transmissions required to broadcast the program to the target set of viewers and/or the number of unintended viewers able to decrypt the program can be reduced by using a strict inequality in line 2 of the equation for the algorithm f-cover shown in FIG. 2 at lower levels, e.g., sets having populations of less than eight viewers, and a non-strict inequality for sets having eight or more viewers. The threshold for determining whether to use a strict or non-strict inequality may vary with the total population of the universe in question. Referring again to the establishment keys shown in FIG. 4 and assuming that the target set of viewers is comprised of viewers numbers 1, 2, 4 and 9, then the candidate establishment keys from which the algorithm f-cover can compile a key cover set for such viewers are keys $e_1$, $e_2$, $e_3$, $e_4$, $e_8$, $e_9$, $e_{12}$, $e_{16}$, $e_{17}$, $e_{19}$ and $e_{24}$. Establishment eight or more members, such as establishment key $e_2$, will be evaluated using a non-strict equality, while establishment keys having fewer than eight members, such as establishment key $e_{10}$, will be evaluated using a strict equality. Accordingly, if we assume that a strict inequality is being used and that the broadcast system operator has selected an f-ratio of 2, then establishment key $e_4$ can be used to compile the key cover set since it has an f-ratio of 1.5, .i.e., (3 total viewers)/(2 target viewers), which is less than or equal to 2. By contrast, establishment key $e_{12}$ can not be used since it has an f-ratio of 2, i.e., (2 total viewers)/(1 target viewer), which is not strictly less than 2.

Figure 5:
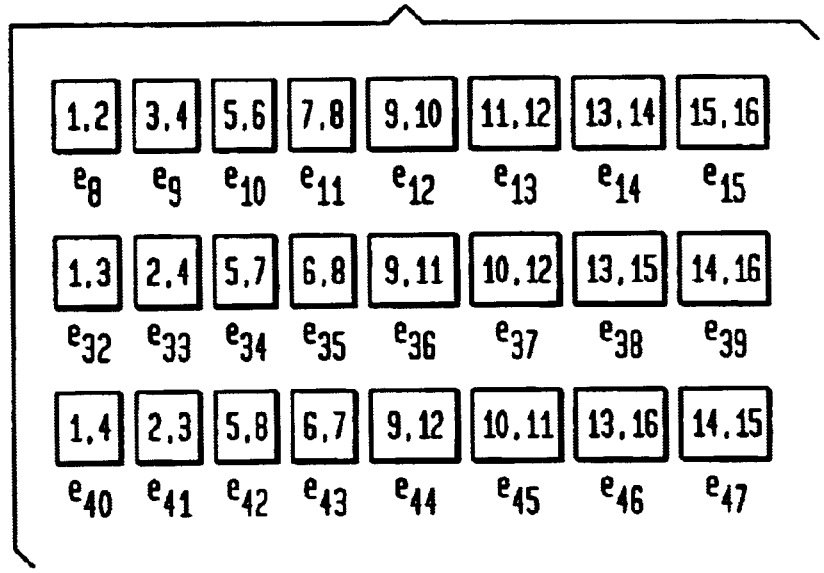
FIG. 5 shows alternative embodiment of an f-redundant key allocation set constructed according to the present invention in which additional sets of establishment keys are added to the f-redundant key allocation set.

In another alternative embodiment of the present invention, the number of encrypted transmissions required to broadcast the program to the target set of viewers and/or the number of unintended viewers able to decrypt the program can be reduced when the f-redundant establishment key allocation set is implemented as a tree by adding extra sets of establishment keys to the key allocation set which in turn results in a few extra keys being stored in each STT. Adding additional sets would provide fewer sets comprised of the intended viewers and the unintended viewers. In order to generate extra key sets, a level-degree profile is used to specify the number of keys each viewer should have at each level in their STT. For a level of size k, a degree of d indicates that each user should belong to d–1 extra sets, in addition to the one basic tree set it belongs to at this level, thereby requiring that nd/k sets of size k be generated such that each viewer belongs to exactly d sets. This is accomplished by randomly permuting the n viewers d–1 times, and for each random permutation, adding the viewers in positions (i–1)k+1, . . . , ik as a set, for i=1, . . . , n/k. Experimentation has shown that extra keys are most efficient when added to the three lowest levels of a tree, e.g., adding sets of couples, quadruplets and octets, as well as adding extra sets of 16. This result will, however, vary with the number of extra keys added and the size of the universe considered. FIG. 5 shows several permuted sets of establishment keys added to the sets of the key allocation set shown in FIG. 4.

In yet another alternative embodiment of the present invention, the number of encrypted transmissions required to broadcast the program to the target set of viewers and/or the number of unintended viewers able to decrypt the program can be reduced by partitioning the f-redundant establishment key allocation set into smaller segments and then creating separate key allocation sets for each segment, wherein a plurality of key cover sets are compiled for each one of the separate allocation sets. For example, if the total population of viewers is 1,000,000 persons, the present invention will operate more efficiently and require fewer transmissions to broadcast encrypted programming to most target sets of viewers if this total population is divided into 1,000 populations of 1,000 viewers, on each one of which the algorithm f-cover is run. Partitioning n into increasingly smaller partitions reduces the number of transmissions required to broadcast the program to the intended set, except for large target sets on the order of k>n/2 for which t=v transmissions, wherein v is the number of segments, must be used instead of 1. Experimentation has shown that there should be at least v on the order of $n^{1/2}$ partitions for larger values of n.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method for broadcasting an encrypted program comprising the steps of:

selecting a set of encryption keys to encrypt a program, wherein the selected set of keys enables a number of unintended broadcast recipients to view the program, thereby requiring fewer encryption keys to broadcast the program to a number of intended broadcast recipients who paid to receive the program than an encryption method which does not enable the number of unintended broadcast recipients to view the program;

compiling an f-redundant key cover set establishment keys to encrypt the program from an f-redundant establishment key allocation set using an algorithm defined by the steps of:

(a) repeat $$A \leftarrow S_i : \frac{|S_i \setminus R|}{|(K \cap S_i) \setminus R|} \leq f; \qquad (b)$$

(c) $A \leftarrow S_i \in A$ which maximizes $|(K \cap S_i) \setminus R|$;

(d) $R \leftarrow R \cup A$; $C \leftarrow C \cup \{A\}$;

(e) until the candidate collection A is empty;

(f) return R, C;

wherein f is the total number of broadcast system viewers to said number of intended recipients; K denotes said number of the intended broadcast recipients who paid to receive the program; the establishment keys used to encrypt and decrypt are described by a collection of key sets S, wherein S={$S_1$, $S_2$, ... } such that $\cup S_i$=U; U represents a set of all viewers who can receive broadcasts from the head-end transmitter, wherein the total number of members of U=n; C is a key cover set; and R a set of recipients of a given key cover set C;

encrypting the program using the encryption keys; and broadcasting the encrypted program wherein both the number of encrypted transmissions required to broadcast the program to the intended paying recipients and the number of unintended recipients are reduced by strictly maintaining an inequality for the step (b) of the algorithm for establishment key set having fewer than eight viewers and by permitting a non-strict inequality for the step (b) of the algorithm for establishment key sets having eight or more viewers.

2. The method according to claim 1, wherein the key cover set is compiled by a broadcast system operator at a head-end transmitter.

3. The method according to claim 1, wherein the key program is a pay-per-view program.

4. The method according to claim 1, wherein the key allocation set is implemented as a tree.

5. The method according to claim 4, wherein the key allocation set is a binary tree.

6. The method according to claim 2, wherein the broadcast system is a cable system.

7. The method according to claim 2, wherein the broadcast system is an Internet.

8. The method according to claim 1, wherein the key allocation set is comprised of a plurality of sets of establishment keys, each one of the plurality of sets of establishment keys being comprised of at least one establishment key.

9. The method according to claim 1, further comprising the step of determining a maximum number of establishment keys to be possessed by each one of the total number of broadcast recipients.

10. The method according to claim 4, wherein both the number of encrypted transmissions required to broadcast the program to the intended paying recipients and the number of unintended recipients are reduced by adding a plurality of extra sets of establishment keys to the f-redundant establishment key allocation set.

11. The method according to claim 1, wherein both the number of encrypted transmissions required to broadcast the program to the intended paying recipients and the number of unintended recipients are reduced by partitioning the f-redundant establishment key allocation set into smaller sets from which a plurality of f-redundant key cover sets are complied.

12. A system for broadcasting, an encrypted program, comprising:

a transmitter for selecting a set of encryption keys to encrypt a program, wherein the selected set of keys enables a number of unintended recipients to view the program, thereby requiring fewer encryption keys to broadcast the program to a number of intended recipients than required by conventional encryption systems, the transmitter also encrypting the program with the encryption keys and broadcasting the encrypted program; and having means for compiling an f-redundant key cover set of establishment keys to encrypt the program from an f-redundant establishment key allocation set using an algorithm defined by (a) repeat $$\Lambda \leftarrow S_i : \frac{|S_i \setminus R|}{|(K \cap S_i) \setminus R|} \leq f; \quad (b)$$

(c) A←$S_i \in$ A which maximizes $|(K \cap S_i) \setminus R|$;

(d) R←R∪A; C←C∪{A};

(e) until the candidate collection A is empty;

(f) return R, C;

wherein f denotes a ratio of a total number of broadcast system viewers to said number of intended recipients; K denotes said number of the intended broadcast recipients who paid to receive the program; the establishment keys used to encrypt and decrypt are described by a collection of key sets S, wherein S={$S_1$, $S_2$, ... } such that $\cup S_i$=U; U represents a set of all viewers who can receive broadcasts from the head-end transmitter, wherein the total number of members of U=n; C is a key cover set; and R a set of recipients of a given key cover set C; and wherein both the number of encrypted transmissions required to broadcast the program to the intended recipient and the number of unintended recipients are reduced by strictly maintaining an inequality for the step (b) of the algorithm for establishment key sets having fewer than eight viewers and by permitting a non-strict inequality for the step (b) of the algorithm for establishment key sets having eight or more viewers.

* * * * *